(12) United States Patent
Nyland

(10) Patent No.: US 6,775,619 B2
(45) Date of Patent: *Aug. 10, 2004

(54) NEURAL NET PREDICTION OF SEISMIC STREAMER SHAPE

(75) Inventor: David Lee Nyland, Palmer, AK (US)

(73) Assignee: WesternGeco L.L.C., Houston, TX (US)

(*) Notice: Subject to any disclaimer, the term of this patent is extended or adjusted under 35 U.S.C. 154(b) by 45 days.

This patent is subject to a terminal disclaimer.

(21) Appl. No.: 10/186,088

(22) Filed: Jun. 28, 2002

(65) Prior Publication Data

US 2003/0023382 A1 Jan. 30, 2003

Related U.S. Application Data

(63) Continuation of application No. 09/658,846, filed on Sep. 11, 2000, now Pat. No. 6,418,378, which is a continuation-in-part of application No. 09/603,068, filed on Jun. 26, 2000, now Pat. No. 6,629,037.

(51) Int. Cl.$^7$ .............................. G01V 1/28; G01V 1/20
(52) U.S. Cl. ........................................................ 702/14
(58) Field of Search ............................ 702/14; 706/928, 706/929, 930; 367/14, 15, 16, 19, 20

(56) References Cited

U.S. PATENT DOCUMENTS 5,461,699 A    10/1995   Arbabi et al.
6,418,378 B1 *   7/2002   Nyland ........................ 702/14

FOREIGN PATENT DOCUMENTS

NO    0 613 025 A1   8/1994
WO   WO 99/35460    7/1999

OTHER PUBLICATIONS

"The Shape of a Marine Streamer in a Cross Current", P. M. Krail & H. Brysk; Geophysics, vol. 54, No. 3, (Mar. 1989), pp. 302–308.

"Dynamic Control of ROBs Making Use of the Neural Network Concept", Tadaski Ooi, Yuki Yoskida, Yoskiaki Takahashi &Hideki Kidouski; Proceedings of the Forth (1994) International Offshore and Polar Engineering Conference, Osaka, Japan, Apr. 10–15, 1994; pp. 374–381.

* cited by examiner

Primary Examiner—Donald McElheny, Jr.
(74) Attorney, Agent, or Firm—Madan, Mossman & Sriram, P.C.

(57) ABSTRACT

A neural network to predict seismic streamer shape during seismic operations having an input layer, an optional hidden layer, and an output layer, each layer having one or more nodes. The first layer comprises input nodes attached to seismic data acquisition operational parameters as follows: vessel coordinates, receiver coordinates, time, vessel velocity, current velocity, wind velocity, water temperature, salinity, tidal information, water depth, streamer density, and streamer dimensions. Each node in the input layer is connected to each node in the hidden layer and each node in the hidden layer is connected to each node in the output layer, the output layer outputting a predicted cable shape. The layer maybe omitted. When the hidden lay is omitted, each node in the input layer is attached to each node in the output layer.

20 Claims, 4 Drawing Sheets

NEURAL NET PREDICTION OF SEISMIC STREAMER SHAPE

CROSS REFERENCE TO RELATED APPLICATIONS

This application is a continuation of the U.S. patent application Ser. No. 09/658,846, filed on Sep. 11, 2000, now U.S. Pat. No. 6,418,378. This application is a continuation in part of U.S. patent application Ser. No. 09/603,068, filed on Jun. 26, 2000, now U.S. Pat. No. 6,629,037, entitled "Optimal Paths for Marine Data Collection" which is incorporated herein by reference.

BACKGROUND OF THE INVENTION

1. Field of the Invention

The present invention relates to a system and method for the generation of a predicted cable shape during seismic data acquisition. In particular the invention provides a neural network trained to predict the shape of a seismic streamer or receiver cable during sea borne, vessel-towed, seismic data collection operations.

2. Description of the Related Art

Cable shape and motion associated with sea borne towing is an important factor in determining the optimal path of a seismic vessel and its associated streamer of receivers during seismic data acquisition operations. In seismic data acquisition surveys, much of the subsurface terrain is improperly sampled or completely missed due to cable feathering or displacement. Accurate prediction of the receiver cable shape is important to anticipate and compensate for the feathering or displacement of the seismic cable during seismic data acquisition. The more accurately a survey path can be selected and executed, the more optimal and efficient the survey path becomes.

There are an infinite number of possible paths that the seismic towing vessel may traverse during the initial and secondary or in fill portions of a seismic survey. Moreover, in many cases, the optimal traversal path can be difficult to determine. If optimal initial and in fill paths can be identified, however, it significantly lowers the total effort and expense associated with seismic data collection. Thus, there is a need for an efficient means of determining the cable shape to attain optimal paths in seismic surveying.

Targets missed on an initial pass have to be re-shot on secondary passes. Each additional pass increases the cost of the survey. Such secondary passes significantly increase the time associated cost to complete a survey. Typical operating costs of a seismic vessel exceed $50,000 per day. Thus, predicting cable shape to attain an optimal path would result in an enormous cost savings for surveying each seismic prospect. These large cost reductions would provide a competitive advantage in the marine data collection market. Thus, cable shape prediction is important in sampling the survey target area during initial and secondary passes. There is a long-felt need in the art for predicting the shape of the seismic streamer during seismic data acquisition operations.

SUMMARY OF THE INVENTION

The above-mentioned long-felt need has been met in accordance with the present invention with a neural network to predict seismic streamer shape during seismic operations. In accordance with a preferred embodiment of the present invention, a system for predicting cable shape is provided comprising a neural network having an input layer, an optional hidden layer, and an output layer, each layer having one or more nodes. The first layer comprises input nodes attached to seismic data acquisition operational parameters as follows: vessel coordinates, receiver coordinates, time, vessel velocity, current velocity, wind velocity, water temperature, salinity, tidal information, water depth, streamer density, and streamer dimensions. Each node in the input layer is connected to each node in the hidden layer and each node in the hidden layer is connected to each node in the output layer, the output layer outputting a predicted cable shape. The hidden layer may be omitted. When the hidden lay is omitted, each node in the input layer is attached to each node in the output layer.

Each connection between nodes has an associated weight and a training process for determining the weights for each of the connections of the neural network. The trained neural network is responsive to the inputs and outputs to generate a predicted cable shape. The training process applies a plurality of training sets to the neural network. Each training set comprises a set of inputs and a desired cable shape. With each training data set, the training process determines the difference between the cable shape predicted by the neural network and the desired or known cable shape. The training process then adjusts the weights of the neural network nodes based on the difference between the output predicted cable shape and the desired cable shape. The error assigned to each node in the neural network may be assigned by the training process via the use of back propagation or some other learning technique.

DETAILED DESCRIPTION OF THE INVENTION

Neural networks are well known in the art. The following terminology will useful to the understanding of the neural network of the present invention. A "Node" is a computational element in a neural network. A "Weight" is an adjustable value associated with a connection between the nodes in a network. The magnitude of the weight determines the intensity of the connection. Negative weights inhibit node firing while positive weights enable node firing. "Connections" are the pathways between nodes that connect the nodes into a network.

A "Learning Law" is a mathematical relationship that modifies all or some of the weights in a node's local memory in response to input signals. The Learning Law equation enables the neural network to adapt examples of what it should be doing and thereby learn. Learning laws for weight adjustment can be described as supervised learning or unsupervised learning. Supervised learning assumes that the desired output of the node is known or can be determined from an overall error that is used to update the weights.

In unsupervised learning the desired output is not known. In unsupervised learning the weights associated with a node are not changed in proportion to the output error associated with a particular node but instead are changed in proportion to some type of global reinforcement signal. An "Activation function" is a mathematical relationship that determines a node's output signal as a function of the most recent input signals and weights. "Back propagation" is the supervised learning method in which an output error signal is fed back through the network, altering connection weights so as to minimize the error. An "Input layer" is the layer of nodes for providing input to a neural network. A "Hidden layer" is the layer of nodes which are not directly connected to a neural network's input or output. An "Output layer" a layer of nodes that provide access to the neural network's results.

Figure 1:
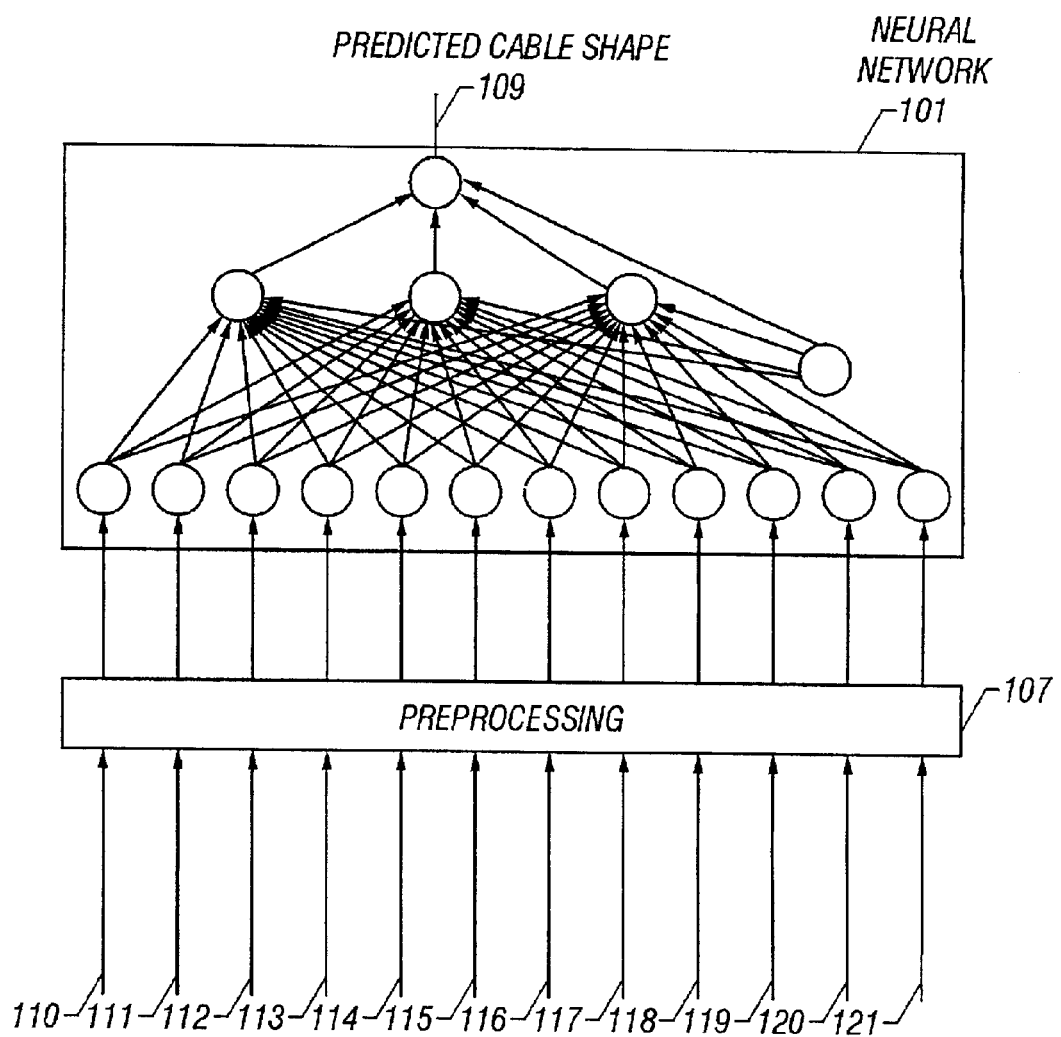
FIG. 1 is an illustration of a neural network in a preferred embodiment of the present invention.

The present invention is a neural network system and method for generating a predicted cable shape. FIG. 1 shows a neural network 101, and preprocessing unit 107. The neural network 101 generates a predicted cable shape 109 from input data applied to its input layer. The operational inputs to the neural network comprise vessel coordinates 110, receiver coordinates 111, time 112, vessel velocity 113, current velocity 114, wind velocity 115 water temperature 116, salinity 117, tidal information 118, water depth 119, streamer density 120, and streamer dimensions 121. These operational inputs are sensed in real time and input to the neural network during seismic data collection. Additional operational data can be sensed and utilized as input to the neural network. Data input to the neural network may be preprocessed by the preprocessing means 107 as shown in FIG. 1. Preprocessing can be used to normalize or recluster the input data.

Figure 3:
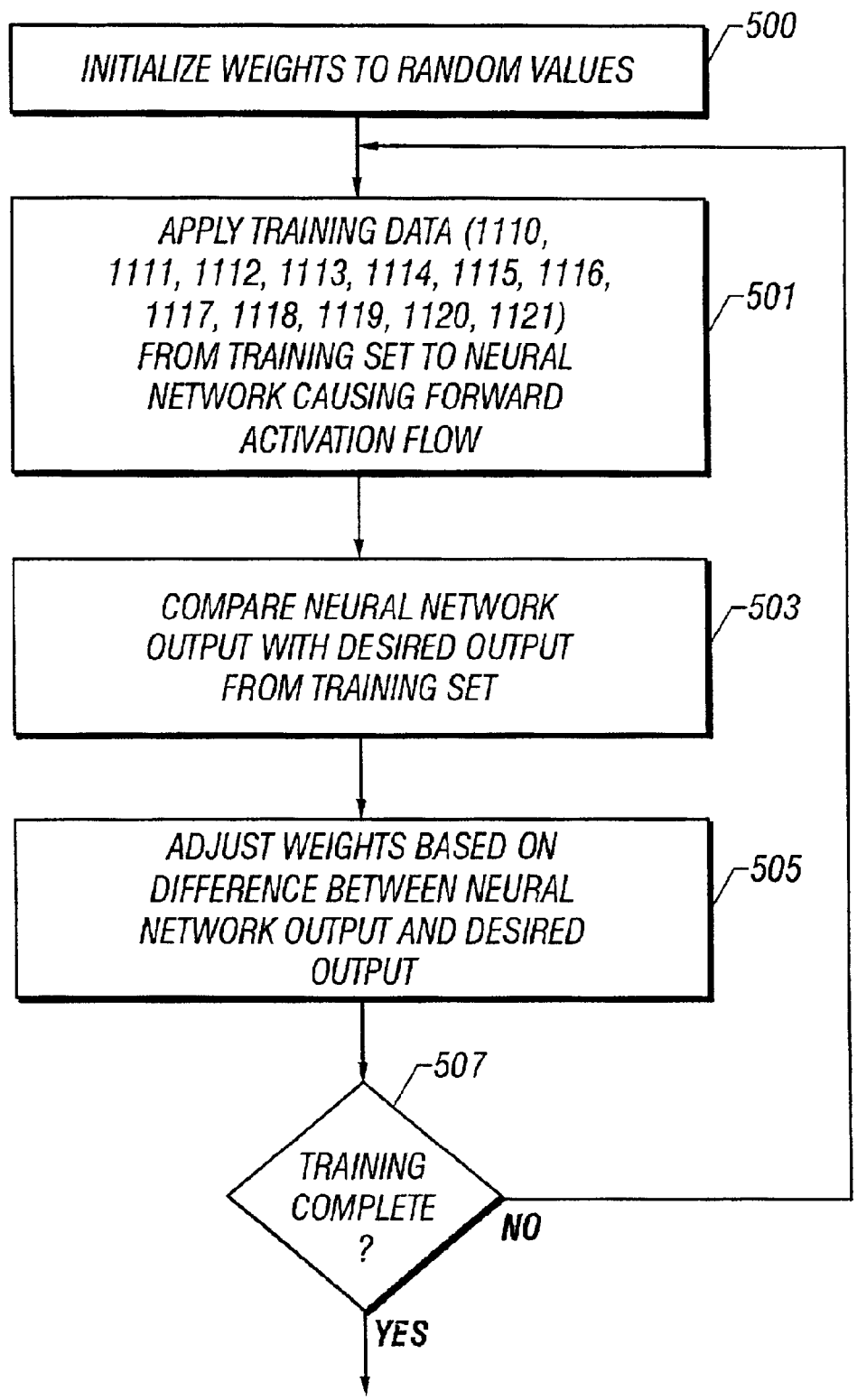
FIG. 3 is a process step chart showing the preferred steps executed in training a neural network of the present invention.

The neural network 101 operates in three basic modes: training, operation and retraining. The training steps are shown in FIG. 3. During training the neural network is trained by use of a training means that presents the neural network with sets of training data. The training data sets comprises vessel coordinates 1110, receiver coordinates 1111, time 1112, vessel velocity 1113, current velocity 1114, wind velocity 1115, water temperature 1116, salinity 1117, tidal information 1118, water depth 1119, streamer density 1120, and streamer dimensions 1121 and a desired output (i.e., actual, known, or correct output). Training data is collected during actual operations or generated by a model and stored for later training of the neural network. Additional operational data obtained by sensing other operational parameters can be generated and utilized as input to the neural network. The neural network generates a predicted cable position based on the training inputs. This predicted cable shape is then compared with the desired or known output. The difference between the predicted cable position generated by the neural network and the desired or known cable position is used to adjust the weights of the nodes in the neural network through back propagation or some other learning technique.

During training the neural network learns and adapts to the inputs presented to it. After the neural network is trained it can be utilized to make a cable position prediction for a given input data set. This mode of operation is referred to as the operational mode. After the operational mode the neural network can be retrained with additional data collected from other surveys. Thus, the neural network making a cable position prediction for one survey, may be retrained with data from a second survey. The retrained neural network can then be used to make a prediction of cable position for the second survey.

Figure 2:
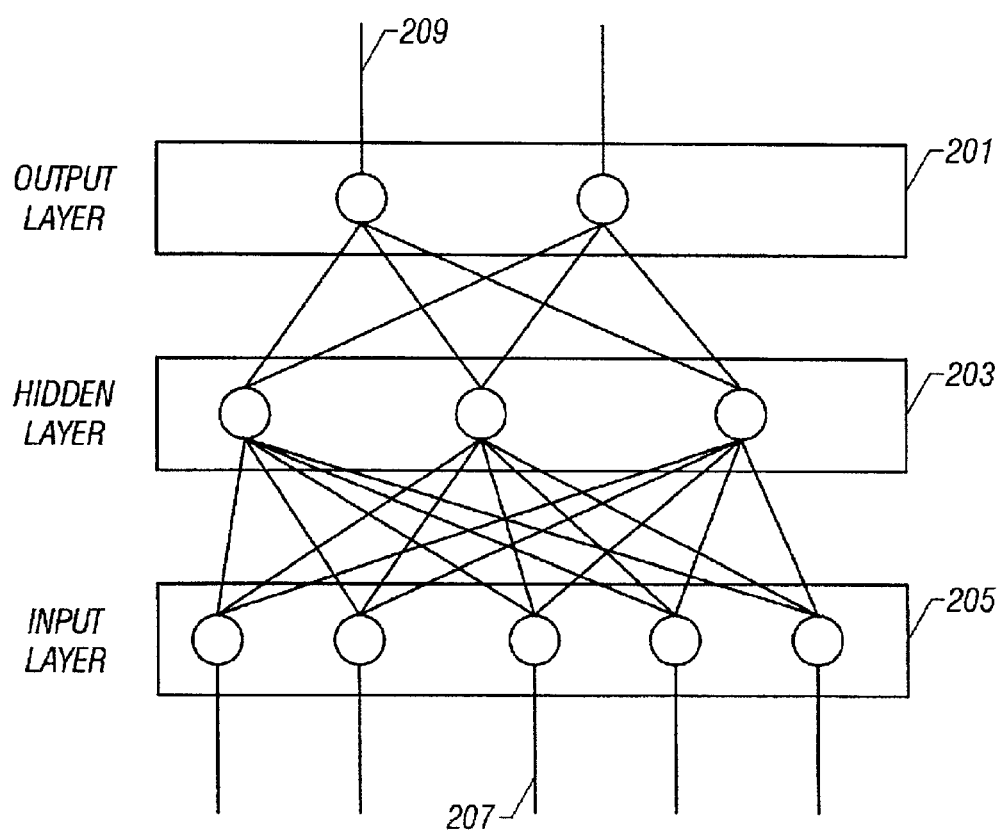
FIG. 2 is an example of a neural network having an input layer, a hidden layer and an output layer.

Referring now to FIG. 2, a representative example of a neural network is shown. It should be noted that the example shown in FIG. 2 is merely illustrative of one embodiment of a neural network. As discussed below, other embodiments of a neural network can be used. The embodiment of FIG. 2 has an input layer 205, a hidden layer (or middle layer) 203 and a output layer 201. The input layer 205 includes a layer of input nodes which take their input values 207 from the external input (vessel coordinates, receiver coordinates, time, vessel velocity, current velocity, wind velocity, water temperature, salinity, tidal information, water depth, streamer density, and streamer dimensions.). The input data is used by the neural network to generate the output 209 (or cable position). Even though the input layer 205 is referred to as a layer of the neural network, the input layer 205 does not contain any processing nodes.

The middle layer is called the hidden layer 203. A hidden layer is not required but, is usually provided. The outputs from the nodes of the input layer 205 are input to each node in the hidden layer 203. Likewise the outputs of nodes of the hidden layer 203 are input to each node in the output layer 201. Additional hidden layers can be used. Each node in additional hidden layers take the outputs from the previous layer as their input.

The output layer 201 may consist of one or more nodes. The output layer receives the output of nodes of the hidden layer 203. The output(s) of the node(s) of the output layer 201 are the predicted cable shape 209. Each connection between nodes has an associated weight. Weights determine the relative effect each input value has on each output value. Random values are initially selected for each of the weights. The weights are modified as the network is trained.

The present invention contemplates other types of neural network configurations for use with a neural network. All that is required for a neural network is that the neural network be able to be trained and retrained so as to provide the needed predicted cable position.

Input data 207 is provided to input computer memory storage locations representing input nodes in the input layer 205. The hidden layer 203 nodes each receive input values from all of the inputs in the input layer 205. Each hidden layer node has a weight associated with each input value. Each node multiplies each input value times its associated weight, and sums these values for all of the inputs. This sum is then used as input to an equation (also called a transfer function or activation function) to produce an output for that node. The processing for nodes in the hidden layer 203 can be performed in parallel, or they can be performed sequentially. In the neural network with only one hidden layer 203 as shown in FIG. 2, the output values or activations would then be computed. Each output or activation is multiplied by its associated weight, and these values are summed. This sum is then used as input to an equation which produces the predicted cable shape 209 as its result. Thus using input data 207, a neural network produces an output 209 which is as a predicted value. An equivalent function can be achieved using analog apparatus.

The output of a node is a function of the weighted sum of its inputs. The input/output relationship of a node is often described as the transfer function. The activation function can be represented symbolically as follows:

$$Y = f(\Sigma(w_i x_i))$$

It is the weighted sum, $\Sigma(w_i x_i)$, that is input to the activation function. The activation function determines the activity level generated in the node as a result of an input signal. Any function may be selected as the activation function. However, for use with back propagation a sigmoidal function is preferred. The sigmoidal function is continuous S-shaped monotonically increasing function which asymptotically approaches fixed values as the input approaches plus or minus infinity. Typically the upper limit of the sigmoid is set to +1 and the lower limit is set to either 0 or −1. A sigmoidal function can be represented as follows:

$$f(x)=1/(1+e^{-(x+T)})$$

where x is weighted input (i.e., ($w_i$ $x_i$)) and T is a simple threshold or bias.

Note that the threshold T in the above equation can be eliminated by including a bias node in the neural network. The bias node has no input but outputs a constant value to all output and hidden layer nodes in the neural network. The weights that each node assigns to this one output become the threshold term for the given node. This simplifies the equation to $f(x)=1/(1+e^{-x})$ where x is weighted input (i.e., ($w_1$ $x_1$). where $X_0=1$, and $W_0$ is added as a weight).

A relational or object oriented database is suitable for use with the present invention. There are many commercial available databases suitable for use with the present invention.

Figure 4:
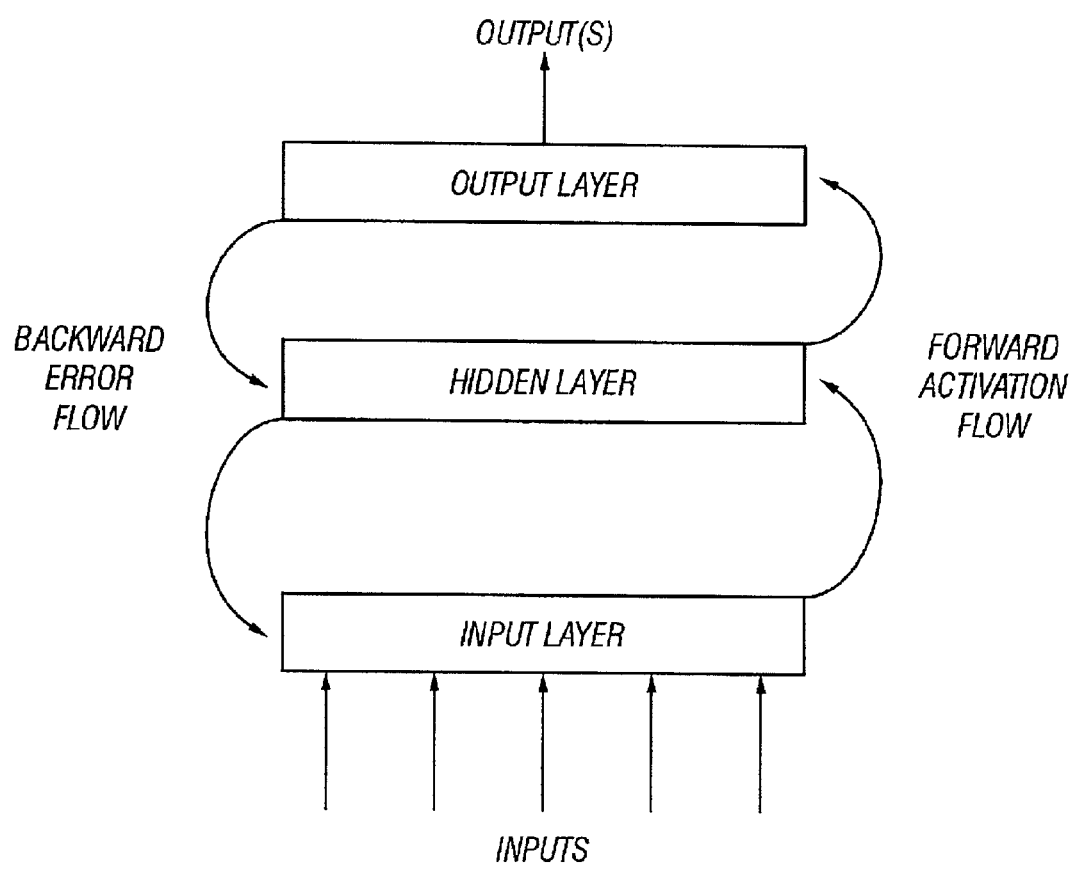
FIG. 4 is an illustration of forward activation flow and backward error flow in a neural network.

The adjustment of weights in a neural network is commonly referred to as training. Training a neural network requires that training data be assembled for use by the training procedure. The training procedure then implements the steps shown in FIG. 3 and described below. Referring now to FIG. 3, the present invention contemplates various approaches for training the neural network. In step 300 the weights are initialized to random values. When retraining the neural network step 300 may be skipped so that training begins with the weights computed from previous training session(s). In step 301 a set of input data is applied to the inputs of the neural network. This input data causes the nodes in the input layer to generate outputs to the nodes of the hidden layer, which in turn generate outputs to nodes of the output layer which produce a result. This flow of information from the input nodes to the output nodes is typically referred to as forward activation flow as shown on the right side of FIG. 4.

Returning now to FIG. 3, associated with the input data applied to the neural network in step 301 is a desired, actual or known output value. In step 303 the predicted cable shape produced by the neural network is compared with the desired, actual or known output. The difference between the desired output and the predicted cable shape produced by the neural network is referred to as the error value. This error value is then used to adjust the weights in the neural network as depicted in step 305.

One suitable approach for adjusting weights is called back propagation in which the output error signal is fed back through the network, altering connection weights so as to minimize that error. Back propagation distributes the overall error value to each of the nodes in the neural network, adjusting the weights associated with each node's inputs based on the error value allocated to it. This backward error flow is depicted on the left hand side of FIG. 4.

Once the error associated with a given node is known, the node's weights is adjusted. One way of adjusting the weight for a given node is as follows:

$$Wnew=Wold+\beta EX$$

where E is the error signal associated with the node, X represents the inputs, Wold represents the current weights, Wnew represents the weights after adjustment, and β is a learning constant or the size of the steps taken down the error curve. Other variations of this method can be used with the present invention. For example the following $$Wnew=Wold+\beta EX+\alpha.(Wnew-Wold)prev$$

includes a momentum term, α(Wnew−Wold)prev, where α is a constant that is multiplied by the change in the weight from a previous input pattern.

The back propagation or other learning technique is repeated with each of the training sets until training is complete. As shown in step 307 a validation test is used to determine whether training is complete. This validation test could simply check that the error value is less than a certain value for a given number of iterations or simply end training after a certain number of iterations. A preferred technique is to use a set of testing data and measure the error generated by the testing data. The testing data could be generated so that it is mutually exclusive of the data used for training. If the error resulting from application of the testing data is less than a predetermined value, training is considered complete. The weights are not adjusted as a result of applying the validation testing data to the neural network.

Note that although the present invention has been described with respect to the basic back propagation algorithm other variations of the back propagation algorithm may be used with the present invention as well. Other learning laws may also be used. For instance, reinforcement learning. In reinforcement learning a global reinforcement signal is applied to all nodes in the neural network. The nodes then adjust their weights based on the reinforcement signal. This is decidedly different from back propagation techniques which essentially form an error signal at the output of each node in the network. In reinforcement learning there is only one error signal which is used by all nodes.

The training sets are then used to adjust the weights in the neural network as described above. Any given training set may be utilized multiple times in a training session. After the neural network is trained operational data is applied to the trained neural network to generate the predicted cable shape.

A preprocessing function 107 is depicted in FIG. 1. Preprocessing of the input values may be performed as the inputs are being applied to the neural network. Back propagation has been found to work best when the input data is normalized either in the range [−1,1] or [0,1]. Note that normalization is performed for each factor of data. The normalization step may also be combined with other steps such as taking the natural log of the input. The logarithmic scale compacts large data values more than smaller values. When the neural network contains nodes with a sigmoidal activation function, better results are achieved if the data is normalized over the range [0.2, 0.8]. Normalizing to range [0.2, 0.8] uses the heart of the sigmoidal activation function. Other functions may be utilized to preprocess the input value.

The preferred embodiment of the present invention comprises one or more software systems. In this context, a software system is a collection of one or more executable software programs, and one or more storage areas, for example, RAM or disk. In general terms, a software system should be understood to comprise a fully functional software embodiment of a function, which can be added to an existing computer system to provide new function to that computer system.

Software systems generally are constructed in a layered fashion. In a layered system, a lowest level software system is usually the computer operating system that enables the hardware to execute software instructions. Additional layers of software systems may provide, for example, database capability. This database system provides a foundation layer on which additional software systems can be built. For example, a neural network software system can be layered on top of the database.

A software system is thus understood to be a software implementation of a function that can be assembled in a layered fashion to produce a computer system providing new functionality. Also, in general, the interface provided by one software system to another software system is well-defined. It should be understood in the context of the present invention that delineations between software systems are representative of the preferred implementation. However, the present invention may be implemented using any combination or separation of software systems.

The database can be implemented as a stand-alone software system which forms a foundation layer on which other software systems, (e.g., such as the neural network, and training means) can be layered. The database, as used in the present invention, can be implemented using a number of methods. For example, the database can be built as a random access memory (RAM) database, a disk-based database, or as a combination of RAM and disk databases. The present invention contemplates any computer or analog means of performing the functions of the database. These include the use of flat files, relational data bases, object oriented databases or hierarchical data bases to name a few.

The neural network retrieves input data and uses this retrieved input data to output a predicted cable shape. The output data can be supplied to the database for storage or can be sent to other software systems such as decision making or planning applications. The input data can be obtained from the database.

It should also be understood with regard to the present invention that software and computer embodiments are only one possible way of implementing the various elements in the systems and methods. As mentioned above, the neural network may be implemented in analog or digital form. It should be understood, with respect to the method steps as described above for the functioning of the systems as described in this section, that operations such as computing or determining (which imply the operation of a digital computer), may also be carried out in analog equivalents or by other methods.

The neural network model can have a fully connected aspect, or a no feedback aspect. These are just examples. Other aspects or architectures for the neural network model are contemplated.

The neural network must have access to input data and training data and access to locations in which it can store output data and error data. One embodiment of the present invention uses an approach where the data is not kept in the neural network. Instead, data pointers are kept in the neural network which point to data storage locations (e.g., a working memory area) in a separate software system. These data pointers, also called data specifications, can take a number of forms and can be used to point to data used for a number of purposes. For example, input data pointer and output data pointer must be specified. The pointer can point to or use a particular data source system for the data, a data type, and a data item pointer. Neural network must also have a data retrieval function and a data storage function. Examples of these functions are callable routines, disk access, and network access. These are merely examples of the aspects of retrieval and storage functions. The preferred method is to have the neural network utilize data in the database. The neural network itself can retrieve data from the database or another module could feed data to the areas specified by the neural networks pointers.

The neural network also needs to be trained, as discussed above. As stated previously, any presently available or future developed training method is contemplated by the present invention. The training method also may be somewhat dictated by the architecture of the neural network model that is used. Examples of aspects of training methods include back propagation, generalized delta, and gradient descent, all of which are well known in the art.

There are several aids for the development of neural networks commonly available. For example, the IBM Neural Network Utility (NNU) provides access to a number of neural paradigms (including back propagation) using a graphical user interface (GUI) as well as an application programmer's interface (API) which allows the network to be embedded in a larger system. The NNU GUI runs on Intel-based machines using OS/2 or DOS/Windows and on RISC/6000 machines using AIX. The API is available not only on those platforms but also on a number of mainframe platforms, including VM/CMS and OS/400. Available hardware for improving neural network training and run-time performance includes the IBM Wizard, a card that plugs into MicroChannel buses. Other vendors with similar software and/or hardware products include NeuralWare, Nestor and Hecht-Nielsen Co.

The set of inputs to the neural network can be preprocessed. The preferable technique for normalizing the inputs is to take the natural log of the input and then normalize it to a value between 0.2 and 0.8. In this way, it can be assured that the "heart" of the sigmoidal function would be utilized. This ameliorated the problems implicit in values that lie on the edges of the function, near 0 and 1. If the data was simply normalized between 0.2 and 0.8, the percentage error would tend to be much larger in the smaller districts. The error, on average, is approximately equal for all inputs; however, an equal error on a smaller district will cause a larger percentage error than in a larger district. To minimize this effect, the data is normalized. The natural log of the data is taken first, which collapses the data and produces a more normal distribution. We then normalize these natural logs and present them to the network.

A feed forward network using twelve inputs nodes, a hidden layer, one output node and standard back propagation performs the cable prediction. Inputs nodes using different operational data and more or less hidden may also be used.

While the present invention has been described using a cable prediction technique and return volume applications as examples, the present invention is not limited to these particular applications.

While the invention has been described in detail herein in accord with certain preferred embodiments thereof, modifications and changes therein may be effected by those skilled in the art. Accordingly, it is intended by the appended claims to cover all such modifications and changes as fall within the true spirit and scope of the invention.

What is claimed is:

1. A cable shape prediction system comprising:
a neural network comprising an input layer, a hidden layer, and an output layer, each layer comprising one or more nodes, nodes in the input layer being connected to operational data, at least one node in the input layer being connected to at least one node in the hidden layer and at least one node in the hidden layer being connected to at least one node in the output layer, the output layer outputting a predicted cable position, each connection between nodes having an associated weight; and a training apparatus for determining the weight for each said connection between nodes of the neural network, the neural network being responsive to the operational inputs for outputting a predicted cable position.

2. The system of claim 1 wherein the training apparatus comprises:
   apparatus for applying a plurality of training sets to the neural network, each training set consisting of historical data and a desired forecast cable position;
   apparatus for determining for each set of training data a difference between the forecast produced by the neural network and the desired forecast cable position; and
   apparatus for adjusting each weight of the neural network based on the difference.

3. The system in claim 2 wherein the training apparatus comprises apparatus for adjusting each weight by use of back propagation.

4. The system in claim 3 wherein the training apparatus further comprises means for applying a test data set to the neural network to determine whether training is complete.

5. The system in claim 4 wherein the test data set is a validation data set.

6. The system in claim 1 further comprising a preprocessor for computing a logarithmic value for each historical datum and for connecting each logarithmic value to the input layer.

7. The system in claim 1 wherein the neural network includes a bias node that has connections to at least one node in the hidden layer and at least one node in the output layer.

8. The system of claim 1 further comprising a normalizing apparatus for normalizing inputs to the neural network.

9. The system of claim 1 further comprising:
   at least one input for receiving at least one of vessel coordinates, receiver coordinates, time, vessel velocity, current velocity, wind velocity, water temperature, salinity, tidal information, water depth, streamer density and streamer dimensions as input to the neural network; and
   at least one output for generating a predicted cable shape output.

10. The system of claim 1 wherein the learning apparatus uses reinforcement learning.

11. A method for cable shape prediction comprising:
    providing operational data to a neural network input layer; and outputting a predicted cable position.

12. The method of claim 11 further comprising:
    applying a plurality of training sets to the neural network, each training set consisting of historical data, an associated statistical forecast cable shape made by the neural net and a desired forecast cable shape;
    determining for each set of training data a difference between the forecast produced by the neural network and the desired forecast cable shape; and
    adjusting each weight of the neural network based on the difference.

13. The method of claim 12 further comprising:
    adjusting each weight is performed by use of back propagation.

14. The method of claim 12 further comprising:
    applying a test data set to the neural network.

15. The method of claim 12 further comprising:
    applying a verification data set to the neural network.

16. The method of claim 11 further comprising:
    computing a logarithmic value for each historical datum and for connecting each logarithmic value to the input layer.

17. The method of claim 11 further comprising:
    applying a bias signal to nodes in the hidden layer and to nodes in the output layer.

18. The method of claim 11 further comprising:
    normalizing inputs to the neural network.

19. The method of claim 11 further comprising:
    receiving operational data as input to the neural network; and
    generating a predicted cable shape output.

20. The method of claim 11 further comprising:
    using reinforcement learning to train the neural network.

* * * * *